Nov. 20, 1928.
H. R. LOOSLEY
1,692,672
BEVERAGE DISPENSING AND COOLING BOX
Filed March 25, 1927  2 Sheets-Sheet 1
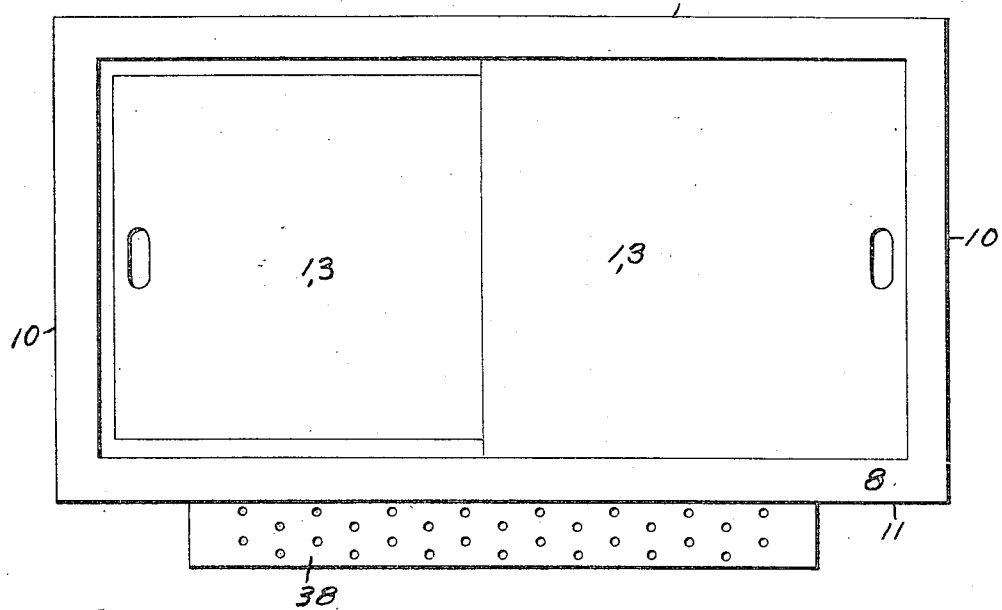
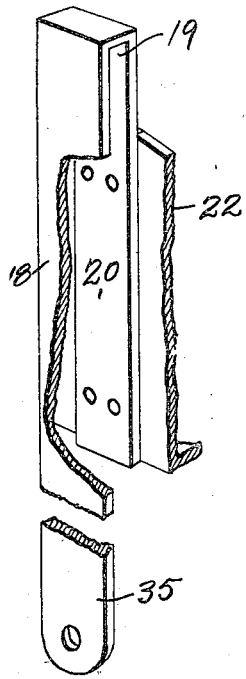
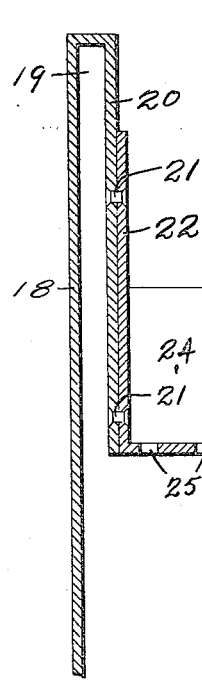
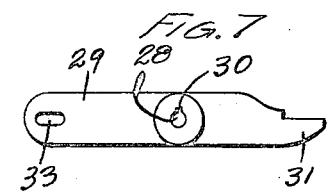
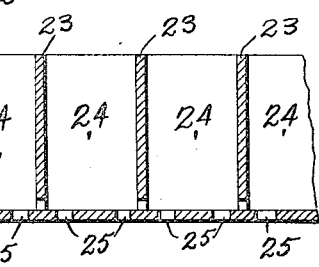
INVENTOR
HENRY R. LOOSLEY
BY Edwards & Longan
ATTY.

Nov. 20, 1928.
H. R. LOOSLEY
1,692,672
BEVERAGE DISPENSING AND COOLING BOX
Filed March 25, 1927    2 Sheets-Sheet 2
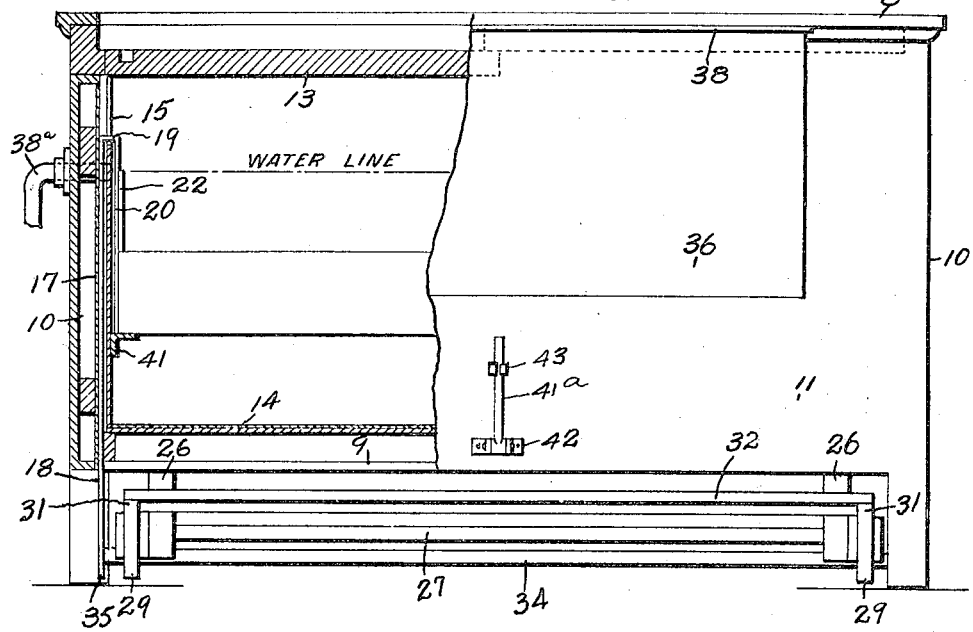
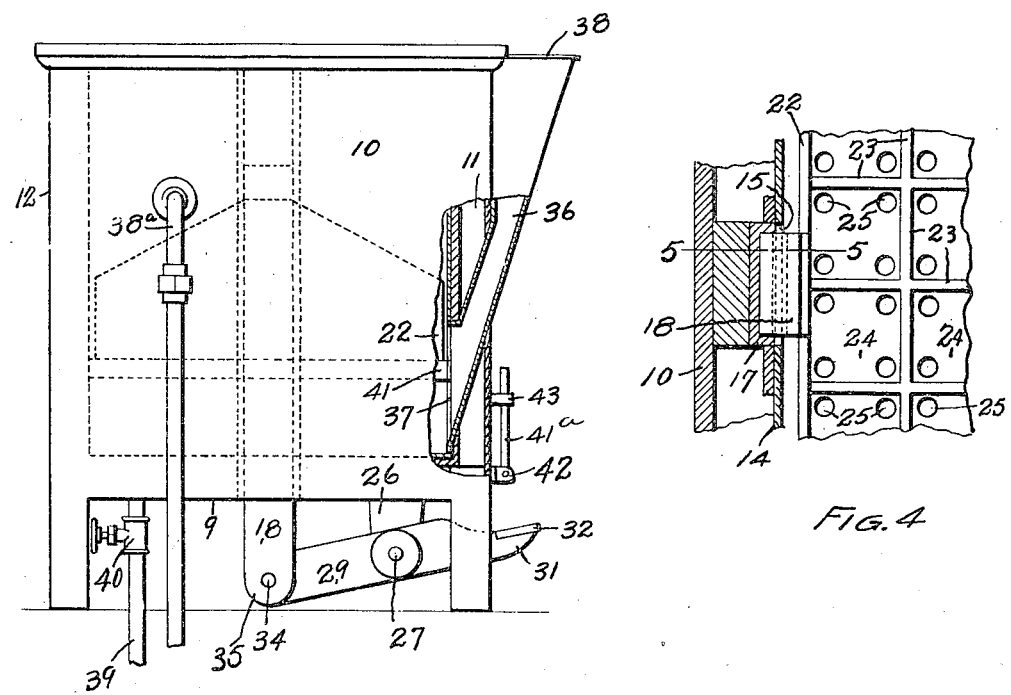
INVENTOR
HENRY R. LOOSLEY
By Edward E. Longan
ATTY.

Patented Nov. 20, 1928.

1,692,672

UNITED STATES PATENT OFFICE.

HENRY R. LOOSLEY, OF EAST ST. LOUIS, ILLINOIS.

BEVERAGE DISPENSING AND COOLING BOX.

Application filed March 25, 1927. Serial No. 178,332.

My invention relates to improvements in beverage dispensing and cooling boxes, and has for its primary object a box which is provided with a tray for holding bottled beverages, which tray can be raised and lowered so that access can be readily had to the bottles for removing them and without plunging the hands into ice water.

A further object is to construct a beverage dispensing and cooling box which is so arranged that ice can be readily supplied thereto beneath the basket without removing the basket from the box.

An important feature of my device is that the bottles containing the beverage are placed in separate compartments formed in a tray or basket and when, as frequently happens, a bottle explodes due to the bottle and its contents being extremely warm and being suddenly submerged in icy water, the tray can be raised and the glass splinters picked out of the compartment thus obviating the danger of cutting the hands. I have frequently observed that where the bottles containing beverages were packed in ice that certain of them broke for some cause or other and, when the person dispensing the beverages reached in to get a bottle, he frequently received very dangerous cuts.

Another particular advantage in my box is that the dispenser can see at a glance how much of each kind of beverage he has and he can also save considerable time in dispensing due to the fact that the bottles, or at least the crowns thereof are clearly visible and, as these crowns most always bear the name of the beverage, he can pick out immediately the kind of beverage desired.

In the drawings:

Fig. 1 is a top plan view of my device;

Fig. 2 is a front elevation with parts broken away and in section showing the tray therein;

Fig. 3 is an end view with parts broken away showing the icing chute;

Fig. 4 is an enlarged fragmental top view of the basket or tray and a portion of one side of the box, that portion being in section and showing the manner of slidably supporting the connecting arms;

Fig. 5 is an enlarged fragmental section taken on the line 5—5 of Fig. 4;

Fig. 6 is an enlarged fragmental perspective of one end of the basket showing the manner of attaching the connecting arm thereto, portions of the basket and arm being broken away and in section; and Fig. 7 is a side elevation of one of the lifting levers.

In the construction of my device I employ a box having a top 8, a bottom 9, end walls 10, a front wall 11, and a rear wall 12. The top is provided with an opening which is adapted to be closed by means of a lid 13. This lid is preferably of the sliding type and is made in halves, although a hinged lid may be used if desired. The sides, front, ends and bottom, and lid are preferably of the ordinary ice box construction; that is, double-walled with a space between. This may be either a dead-air space as illustrated or it may be packed with some heat insulating material such as cork, mineral wool and the like.

The box is provided with a water-proof lining 14, which is also of the ordinary lining material used for ice boxes. A portion of each side of the lining is provided with a cutaway portion 15, the purpose of which will be explained in detail later. Carried by each of the sides is a slide 17 in which the connecting arms 18 reciprocate or move up and down or vertically. The upper portion of each of the arms 18 is U-shaped as illustrated by the numeral 19 and has a short depending arm 20. This permits the connecting arms to pass upward on the outside of the lining 14 and downward on the inside and through the cutaway portion 15.

Secured to the depending arms 20 by means of rivets or similar fastening means 21 are the side members 22 of the basket or tray. This basket or tray may be either of sheet metal as illustrated in the drawings or it may be made of woven wire. The basket is provided with a number of partitions 23, which extend both longitudinally and transversely of the basket and are for the purpose of dividing it into a plurality of compartments 24, each of which is sufficiently large to receive a single bottle of beverage.

When a sheet metal basket is used, each of the compartments is provided with one or more openings 25 in its bottom. This is for the purpose of permitting water to pass readily therethrough and in a great measure reduces the resistance to the raising of the basket.

Secured to the underside of the box are brackets 26 in which is rotatably mounted a shaft 27. The shaft 27 also passes through an opening 28 formed intermediate the ends of the lifting levers 29. The lifting levers are preferably provided with a key-way 30 so that the levers can be securely attached to the shaft or rod 27.

My purpose in thus securing the levers against independent rotation on the shaft 27 is to cause an equal amount of movement at the ends of both of the levers for the reason that the device is not always operated from the center of the box and if these levers were permitted independent rotation on the shaft, there would be a tendency, if the device were operated near one end of the box, to raise that end of the basket only.

The ends 31 of the levers 29 have attached thereto a treadle 32 which extends substantially the width of the box. The opposite end of the lifting levers 29 are provided with a slot 33 through which a shaft 34 extends. This shaft is also secured to the lower ends 35 of the connecting arms 18. The purpose of this sliding connection between the lifting levers and the shaft 34 is to permit the arms to be raised vertically. Were these arms not slotted, there would be a tendency when the device is operated to cause the shaft 34 to travel in an arcuate path and not exert a straight lift on the arms.

Carried by the front 11 of the box is an icing chute 36, which communicates with the interior of the box through an opening 37. This opening is so located that when ice is inserted through the chute, it will be directed to the bottom of the box and below the basket. The top of the chute is provided with a reticulated lid 38 on which the bottles can be set when removed from the box and all drippings passed through this lid into the chute and so back into the box.

Extending through the side of the box is a drain pipe 38$^a$ which enters the box at a predetermined distance above the bottom thereof so as to establish a constant water level and prevent the water rising sufficiently high to pass through the cutaway portion 15 in the lining 14. The opposite end of the drain pipe 38$^a$ is connected to a sewer. Projecting from the bottom of the box is a drain pipe 39 which is provided with a valve 40 by means of which the entire box can be drained when it is desired to cleanse the same. The opposite end of this drain pipe is also connected to a sewer. The inside of the box is also preferably provided with a bracket or similar means 41, which supports the basket when in lowered position and acts as a stop to limit its submergence in the water.

The operation of my device is as follows: A certain amount of cracked ice is introduced into the bottom of the box through the chute 37. The lid is then opened and water introduced into the box until it passes out through the overflow pipe 38$^a$. The basket is then raised and filled with bottles of beverage, the raising of the basket being accomplished by depressing the treadle 32, which causes the connecting arms 18 to raise carrying the basket with it.

After this tray has been filled with the bottled beverage, it is lowered into the water. This lowering will naturally cause a displacement of water in the box causing it to rise and flow out through the pipe 38$^a$. This pipe being sufficiently large to take care of this rise so that it will not rise high enough to enter the cutaway portions 15 in the sides of the lining. The lid is then closed and after a sufficient time has elapsed for the beverage to become cooled, the device is ready to be used for dispensing these beverages. Then when the operator wants to dispense from the box, it is only necessary to open the lid, raise the basket or tray by means of the treadle, pick out the beverage he wants, which he can readily do because approximately half of the bottle has been raised above the liquid level in the box, and after removing the beverage or as many bottles as he desires, he can either immediately replace these bottles with fresh bottles or merely re-submerge the device. In this way by working from the front to the back of the tray he can always have chilled bottles of beverage ready to be dispensed and due to the fact that the bottles are submerged directly in icy water, they become chilled much more readily than if they were merely packed in ice, or if they were placed in containers which would insulate them from the water.

It will also be observed that during the raising and lowering of the basket or tray this has a tendency to agitate the water causing the warmer water, which has risen to the top, to be intermingled with the colder water near the bottom of the box so that a substantially uniform temperature of water throughout the box will be maintained. After the box has been used a certain length of time it will be necessary to renew the water in order to prevent its becoming stale, and having a bad odor. In this instance, the valve 40 is opened and all of the water drained from the box after which any cleansing solution can be injected into the box and by raising and lowering the tray this solution is agitated thereby loosening all accumulations of slime and the like, which are always present in ice water. The valve is then again opened, this solution drawn off, the valve closed and fresh water added, which is again agitated so as to intermingle with any of the cleansing solution remaining, and then drawn off through the valve 40. This will leave the box in a perfectly sweet and clean condition and ready to be recharged with ice and water.

It will also be noted that on the front of my device I have provided a pivoted member 41$^a$ which is pivoted in brackets 42 carried by the front of the box. This member 41$^a$ is held in upright position by means of a spring-clip 43 and is designed to hold the treadle in depressed position while filling the tray. In other words, it will hold the tray in raised position while being charged with bottles of beverage so that the person dispensing the goods will not have to raise and lower the tray every time he wants to replenish same.

Having fully described my invention, what I claim is:—

1. A beverage dispensing and cooling box comprising a box having a lid, a tray divided into compartments suspended in said box, means for raising and lowering said tray, means located within said box for limiting the lowering of said tray, means carried by the front of said box through which crushed ice can be inserted in said box below said tray without removing said tray or draining or opening the lid of said box, and means for holding said tray in raised position.

2. A beverage dispensing and cooling box comprising a box having double front, rear and side walls and a double bottom, a waterproof lining for said box, a portion of the lining adjacent the upper edge of the lining for the ends being cut away, arms having U-shaped upper ends slidably vertically carried by the ends of the box, the U-shaped end of each arm passing through the cutaway portion of the lining so that one portion thereof will be located on the inside of the lining, a tray secured at its ends to said last mentioned portions, means carried by said box and pivotally connected to the lower ends of said arms for raising and lowering the same whereby said tray is raised and lowered, means located within the box for supporting said tray above the bottom thereof when in lowered position, and means carried by the front of said box for holding said tray in elevated position.

In testimony whereof I have affixed my signature.

HENRY R. LOOSLEY.